Dec. 2, 1969 N. H. EDSTRÖM 3,482,047
INTERMEDIATE EXCHANGE FOR PULSE CODE MODULATED
TIME DIVISION MULTIPLEX SIGNALS
Filed Sept. 9, 1964 8 Sheets-Sheet 1

INVENTOR.
NILS HERBERT EDSTRÖM
BY Hane and Nydick
ATTORNEYS

Dec. 2, 1969 N. H. EDSTRÖM 3,482,047

INTERMEDIATE EXCHANGE FOR PULSE CODE MODULATED TIME DIVISION MULTIPLEX SIGNALS

Filed Sept. 9, 1964 8 Sheets-Sheet 2

INVENTOR.
NILS HERBERT EDSTRÖM
BY Hane and Nydick
ATTORNEYS

INVENTOR.
NILS HERBERT EDSTRÖM
BY Hane and Nydick
ATTORNEYS

INVENTOR.
NILS HERBERT EDSTRÖM
BY Hane and Nydick
ATTORNEYS

INVENTOR.
NILS HERBERT EDSTRÖM
BY Hane and Nydick
ATTORNEYS

INVENTOR.
NILS HERBERT EDSTRÖM
BY Hane and Nydick
ATTORNEYS

INVENTOR.
NILS HERBERT EDSTRÖM
BY Hane and Nydick
ATTORNEYS

INVENTOR
NILS HERBERT EDSTRÖM
BY Hane and Nydick
ATTORNEYS

United States Patent Office 3,482,047
Patented Dec. 2, 1969

3,482,047

INTERMEDIATE EXCHANGE FOR PULSE CODE MODULATED TIME DIVISION MULTIPLEX SIGNALS

Nils Herbert Edström, Hagersten, Sweden, assignor to Telefonaktiebolaget L M Ericsson, Stockholm, Sweden, a corporation of Sweden Filed Sept. 9, 1964, Ser. No. 395,170
Claims priority, application Sweden, Sept. 18, 1963, 10,189/63
Int. Cl. H04j 3/06
U.S. Cl. 179—15 4 Claims

ABSTRACT OF THE DISCLOSURE

A pulse code modulated time division multiplex telecommunication system comprises an intermediate exchange connected via incoming and outgoing links to subexchanges. The intermediate exchange includes means for receiving the pulse code modulated signals transmitted serially, and assembling them to form parallel binary words. The words are stored in a memory wherein separate registers are assigned to each of the links. Addressing means select the registers under control of a central controlling means so that the words are recorded in registers associated with desired outgoing links. When the words are read from the registers to the desired outgoing links a clock means controls the serial transmission to preserve the proper positional relationship of the elements of the binary words.

Figure 1A:
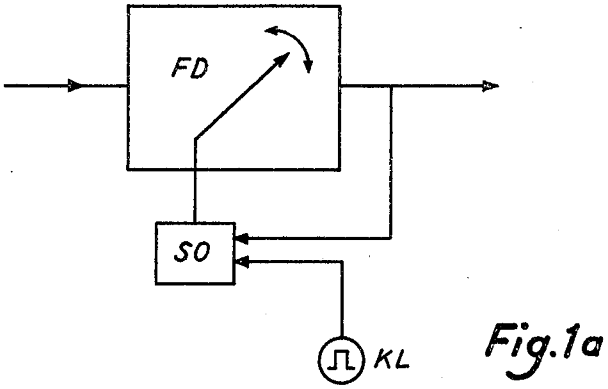

The present invention relates to pulse code modulated, time division multiplex telecommunication systems and more particularly to the intermediate exchanges of such systems.

In systems for transmitting pulse code modulated time division multiplex signals between a number of senders and receivers through an intermediate exchange which connects an arbitrary incoming channel (time pulse position) with an arbitrary outgoing channel, the signals must be in synchronism as well as in phase with each other. For controlling the signals in synchronism by means of a central clock device there are a number of different known arrangements. The compensation of the phase shift and of the difference in the phase shift, arising between the signals transmitted through different links due to the different propagation times of the links, has however not yet been solved in a satisfactory manner.

It has been proposed previously, for example in British Patent 921,384, to bring the signals arriving through the different links, into phase with each other by means of a delay line which has a variable delay and is controlled by a servo means. The servo means compares the phase of the incoming signal with the phase of the central clock and, depending on whether the difference is positive or negative, the delay of the delay line will decrease or increase until phase conformity has been obtained. The disadvantage of this arrangement is that a great accuracy is necessary to compensate the phase. Furthermore a slow displacement of the time of the pulses in relation to the servo means occurs during a telecommunication connection owing to the slow variations of the propagation times caused, inter alia, by changes of the temperature of the lines. A further disadvantage is that such a solution necessitates an expensive equipment per link.

Another difficulty in the previously suggested solutions is that the phase position is locked for the different channels and consequently there is no possibility to select different channels for the incoming and the outgoing link. In other words, it is necessary to work in the same pulse position in the incoming and outgoing link and consequently a great congestion occurs. It is an object of the invention to provide an intermediate exchange which solves the above-cited problems.

According to the invention a quite different principle is used. Each link is caused to work in its own phase without carrying out any phase compensation on the lines. However each link is provided with an identification sign so that the signals arriving through the link will be recognized by the control circuits of the intermediate exchange, stored and then sent out in synchronism and in a correct phase by means of a central clock device. In consequence of this it may also be possible to change arbitrarily time pulse positions or channels between the originating and the terminating PCM-exchange (pulse coded modulated), so that a congestion free network can be obtained.

More particularly, the invention contemplates that the intermediate exchange contains a memory for storing in a coded state the time division multiplex signals arriving to the intermediate exchange, in correspondence to the time division multiplex position and to the address of destination defined by the output but independently of possible displacements of the signals arriving at the exchange, and a central clock device which controls the sending of all signals stored in the memory in a coded state, in synchronism and in phase with each other, so that the phase shift between the pulses of the different signals arriving at the intermediate exchange has no influence on the signals sent out.

Figure 1B:
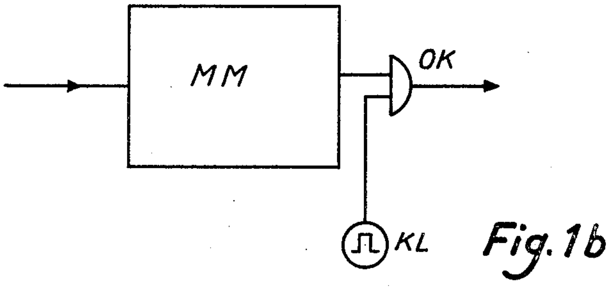
Figure 14:
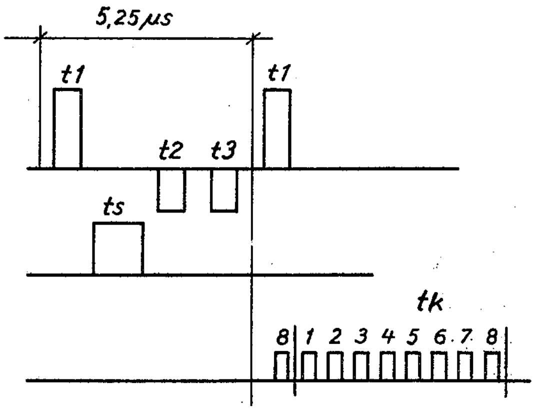
Figure 2:
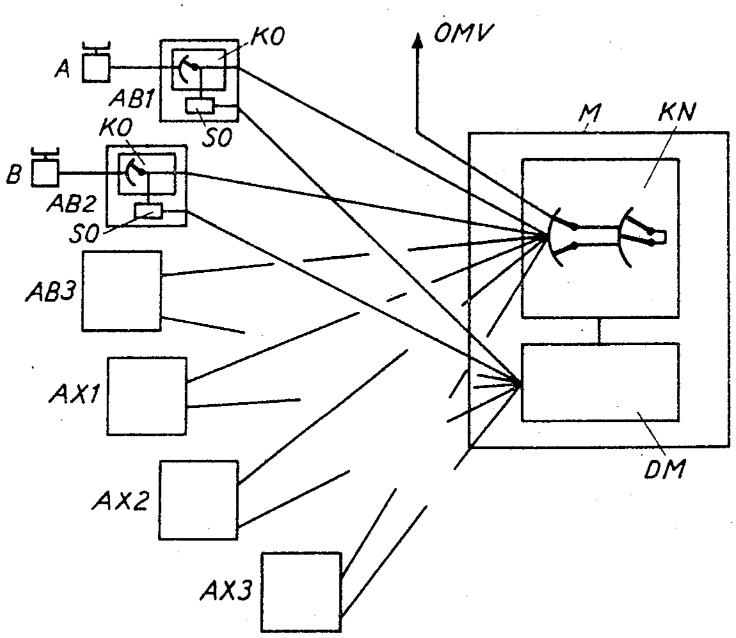
Figure 3:
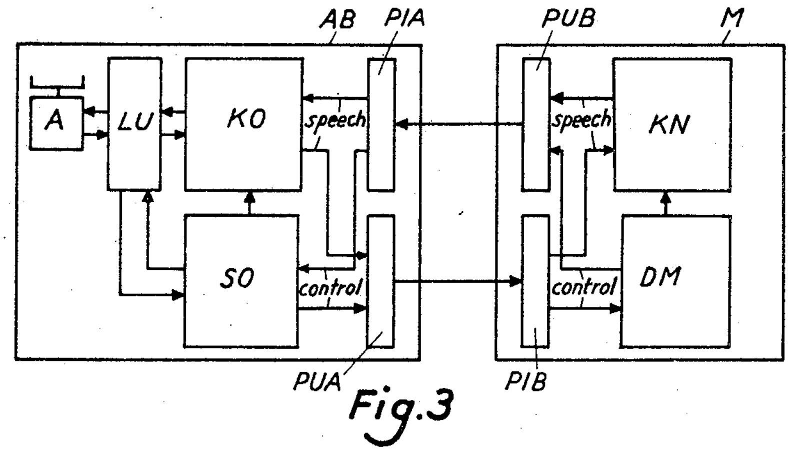
Figure 4:
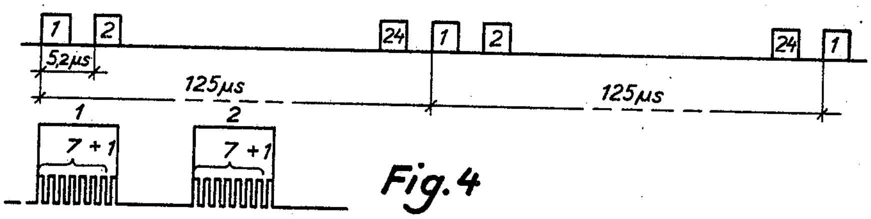
Figures 5, 6:
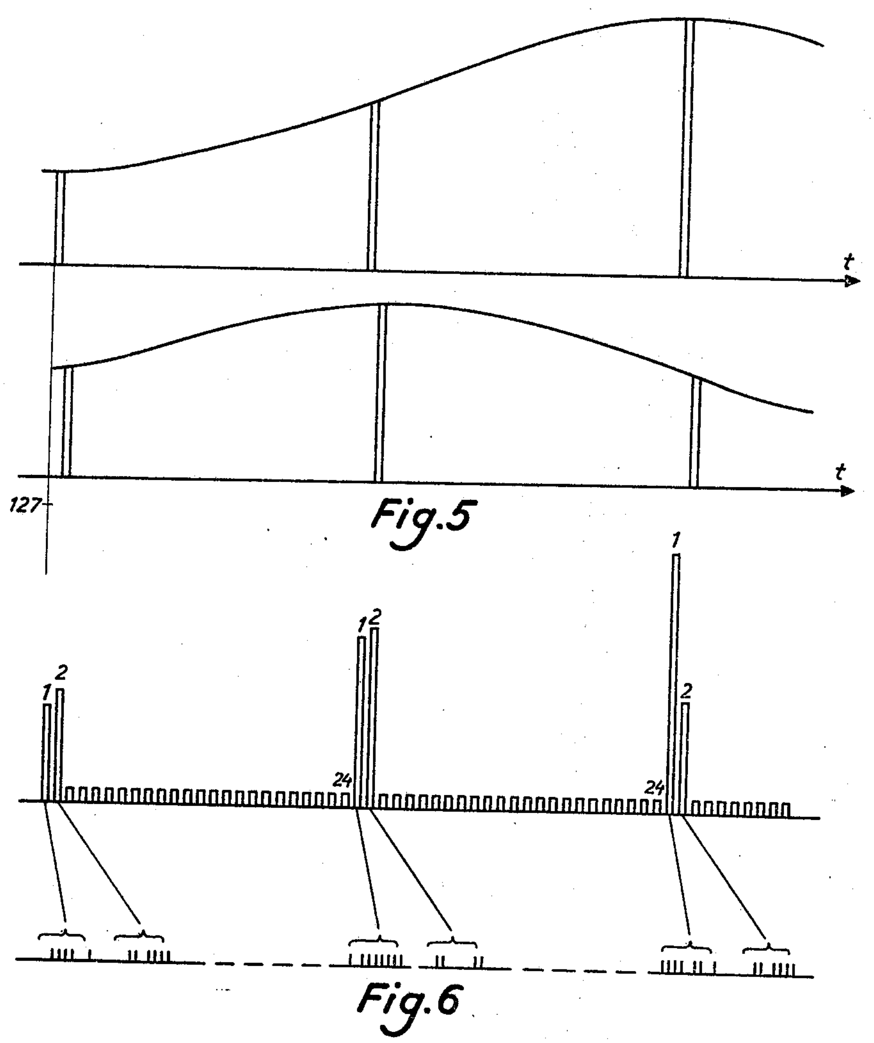
Figure 7:
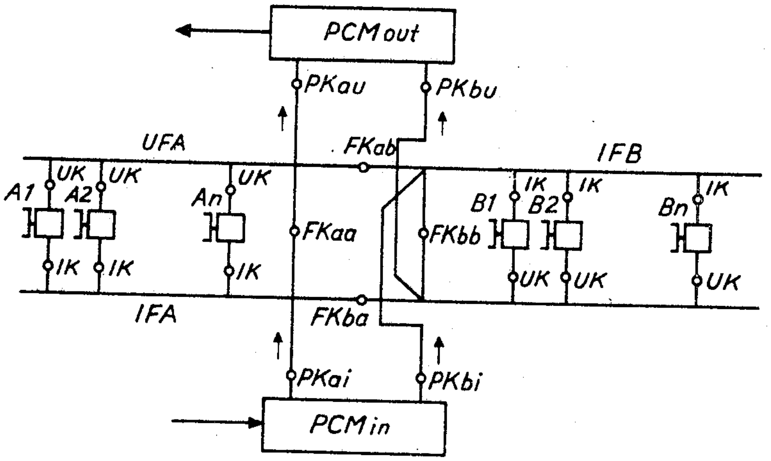
Figure 8:
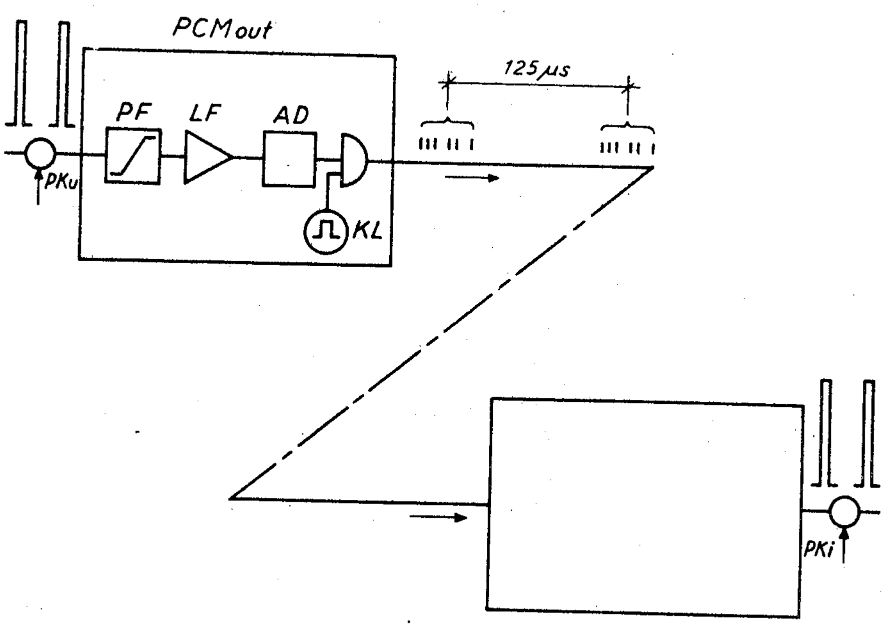
Figure 9:
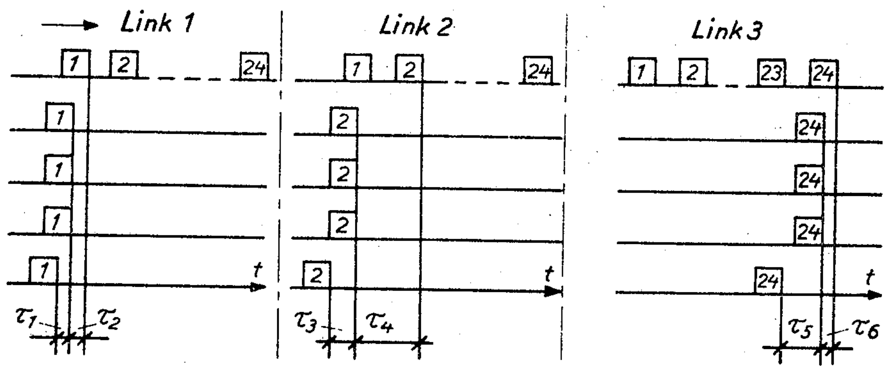
Figure 9:
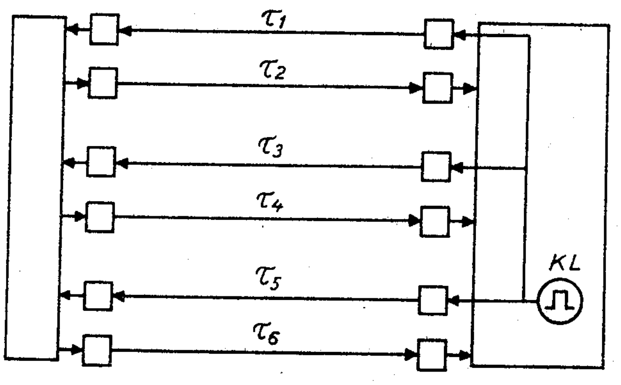
Figure 10:
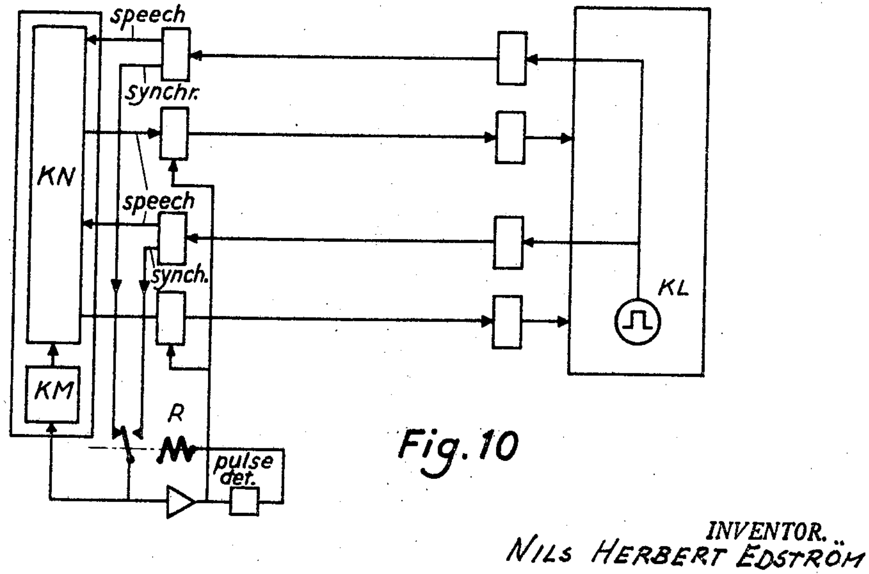
Figure 11:
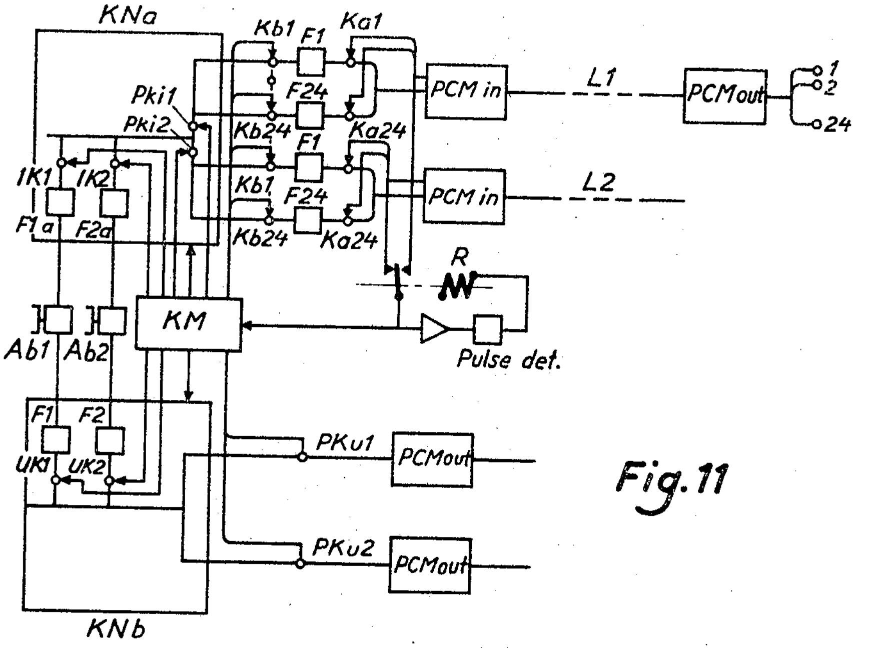
Figures 12A, 12B, 12C, 12D:
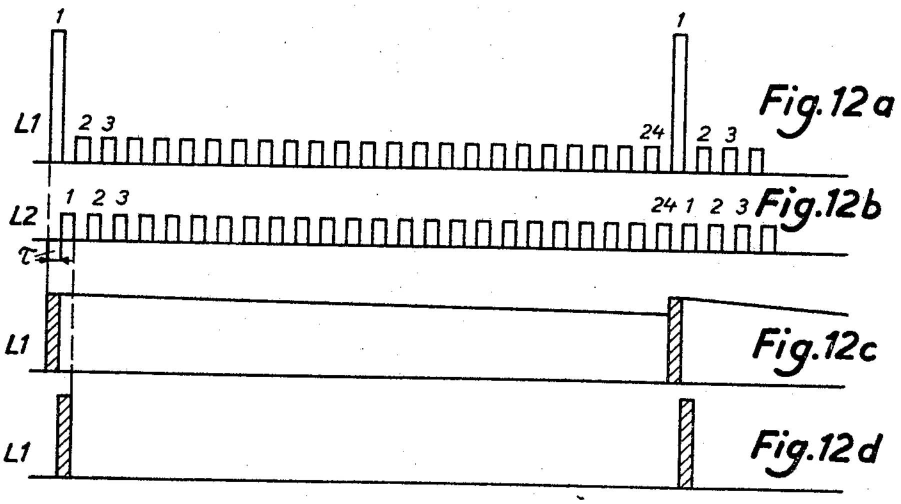
Figure 13:
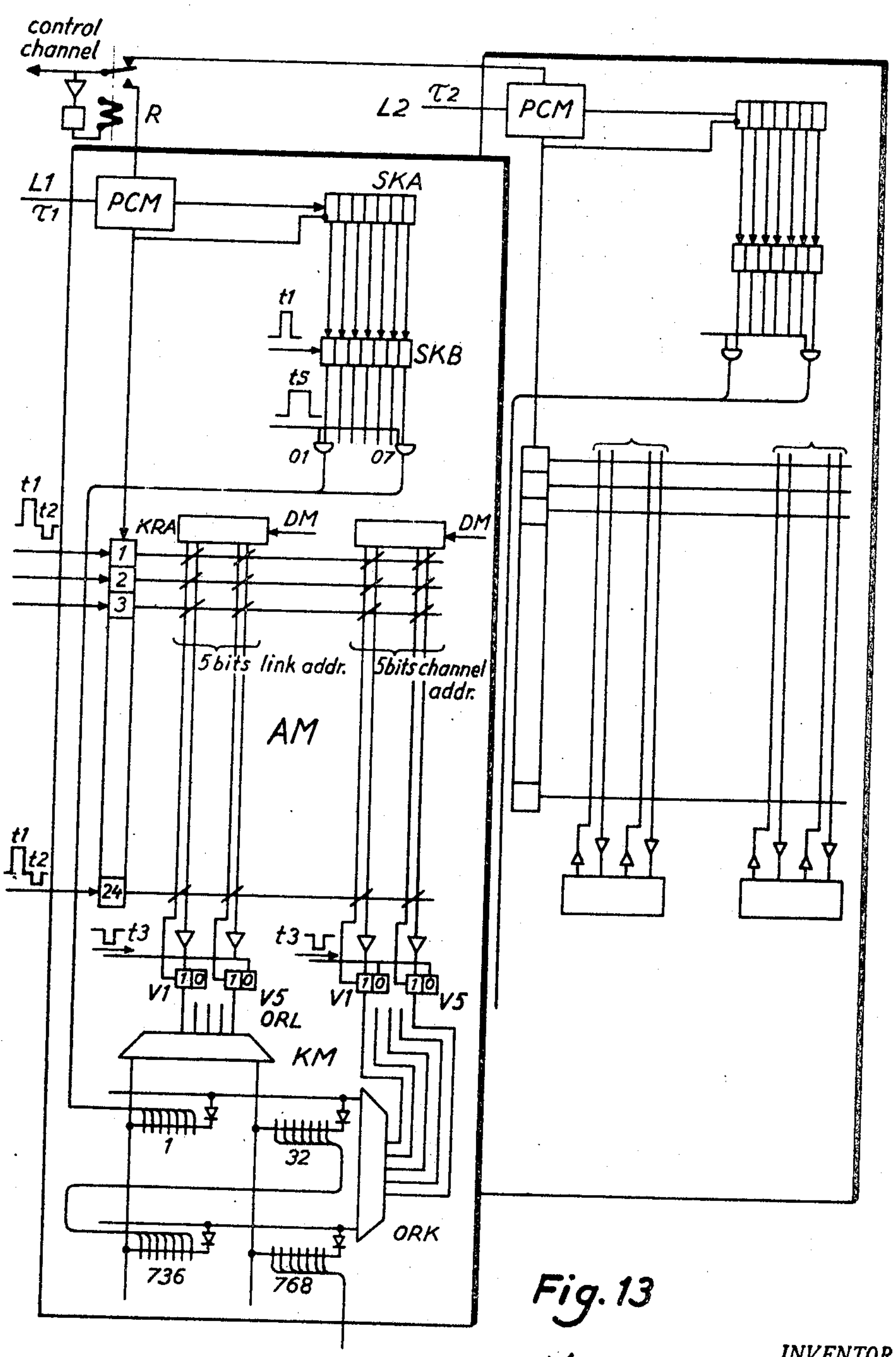
Figure 15:
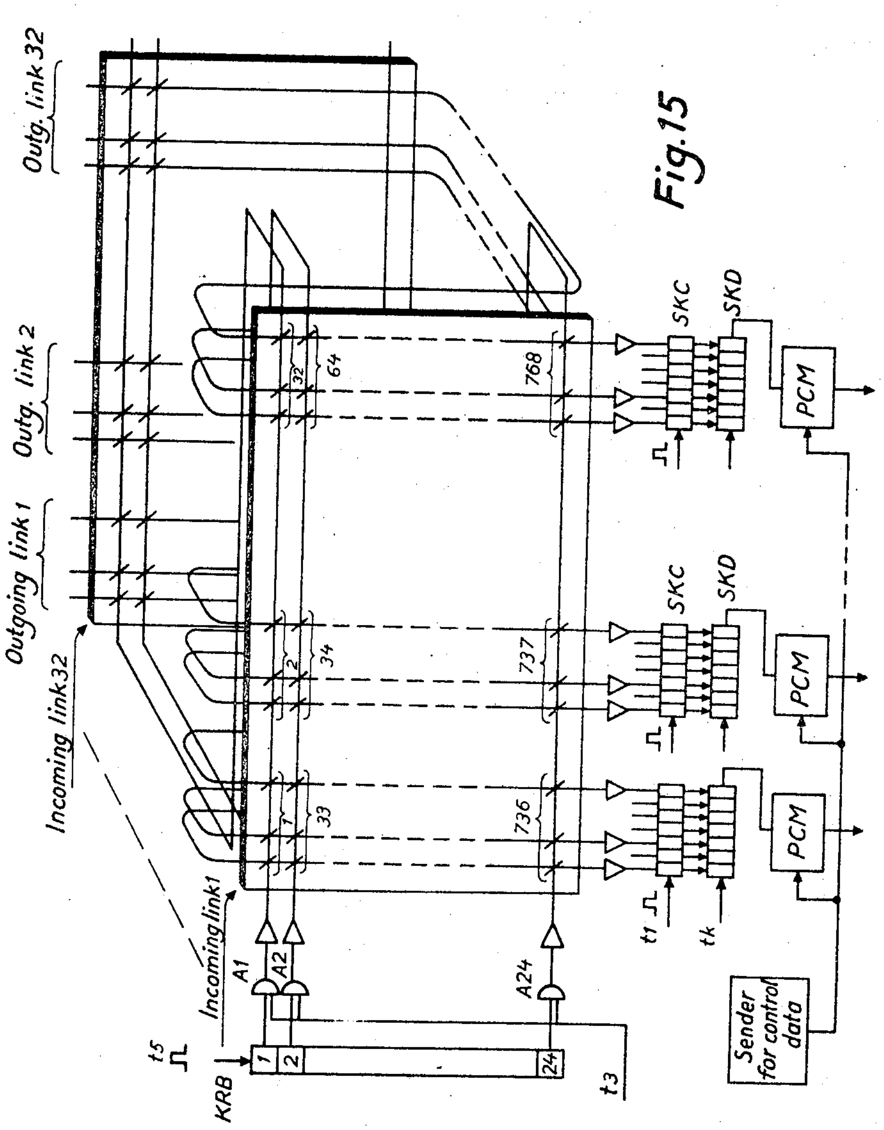

The invention will be explained in greater detail by means of a presently preferred embodiment with reference to the accompanying drawing in which: FIGS. 1*a* and 1*b* show a comparison between the previously known principle of phase compensation and the principle of the present invention; FIG. 2 shows a block diagram of a telephone system in which the principle of the invention has been applied; FIG. 3 shows, in the form of a block diagram, the connection between a main exchange and an arbitrary exchange; FIG. 4 shows a timing diagram of the transmitted pulse code modulated time division multiplex signals; FIG. 5 shows the time relationship of two signals which are transmitted in two adjacent time pulse positions; FIG. 6 shows in an enlarged scale that pulse amplitude values indicated in FIG. 5, expressed as pulse code modulated signals; FIG. 7 shows two groups of subscribers in a telephone exchange working according to the time division multiplex principle; FIG. 8 shows a conventional PCM-system with the sender side in the form of a block diagram; FIG. 9 shows diagrammatically the phase shift between the main exchange and the different subexchanges; FIG. 10 shows diagrammatically the manner in which the clock pulse of a sub-exchange is controlled by means of the synchronizing pulses; FIG. 11 shows in the form of a more detailed block diagram the synchronization in a sub-exchange upon transmission through a number of links; FIGS. 12*a*–12*d* show a timing diagram of the pulses and the restoring of the speech signal when compensating the phase difference in a subexchange; FIG. 13 shows diagrammatically two PCM-terminal equipments and the means cooperating with these in the main exchange; FIG. 14 shows a timing diagram of the different clock pulses generated by the central clock of the main exchange; and FIG. 15 shows the memory of the main exchange together with the means used for the reading out and the sending of the recorded signals.

FIG. 1*a* shows diagrammatically the principle of a known phase compensating means for pulse code modulated signals arriving through a number of transmission links to an intermediate exchange. Each incoming link comprises a delay line FD with a variable delay and a control means SO which carries out a comparison between the phase of the incoming signal and the phase of a central clock device KL and in dependence on the comparison increases or decreases the delay of the delay line until the phase difference is nulled. As it has been mentioned in the preamble, the disadvantage of this arrangement is that a great accuracy is necessary to compensate the phase since variations will arise in the propagation times due to the temperature changes of the line. In addition, an expensive equipment is required per link.

FIG. 1*b* shows diagrammatically the principle of the phase compensation according to the present invention. To each incoming link belongs an intermediate memory MM in which the pulse code modulated signals are stored without regard to the phase position of the signal. From here the signals are supplied to an and-circuit OK which also receives a signal from the central clock device KL of the main exchange so that the supplying of the signals from all links occurs in step with the central clock device without regard to the possible differences in the delay of the different links. This principle will be further elucidated in connection with the embodiment described below.

FIG. 2 shows a block diagram of a telephone system according to the invention, comprising a main exchange M and a number of private branch exchanges AB1-3 and branch exchanges AX1–3. The function of the branch exchanges and of the private branch exchanges shows a great resemblence so that from the point of view of the invention it is enough to describe only the function of a private branch exchange by way of example in co-operation with the main exchange. FIG. 2 shows that the main exchange comprises a switching network KN and a data processing equipment DM which controls the switching process. Each of the exchanges comprises switching means KO and control means SO. Both the speech and the control connections are indicated symbolically in FIG. 2. However, as it will appear from the description herebelow there does not exist any separate physical connection for the speech and for the control signals. The control order is transmitted in both directions by utilizing definite pulse positions in the pulse code modulated signals. The main exchange is in communication with the surroundings, i.e., with other not necessarily electronic exchanges.

FIG. 3 shows in the form of a block diagram the connection between the main exchange M and an arbitrary exchange. The main exchange comprises in the same manner as in FIG. 2 a switching network KN and a data processing equipment DM. The branch exchange AB comprises switching means KO, control means SO and a line equipment LU which cooperates with the switching means as well as with the control means. By PIA and PUA is designated the terminal equipment for the pulse code transmission on the side of the private branch exchange and by PUB and PIB is designated the terminal equipment for the pulse code transmission on the side of the main exchange. As indicated symbolically there is no difference between the transmission channels of the speech signals and the control signals. The function and control of the time division multiplex exchange is not described here as it is known per se. In order to explain the principle of the invention there is selected as an example a time division multiplex system having 24 time pulse positions where each pulse that is pulse amplitude modulated by the speech signals, has a duration of 5.2 $\mu$s. and the time slot of a group or "frame" consisting of 24 pulses is 125 $\mu$s. corresponding to a repetition frequency of 8 kHz. as is indicated in FIG. 4.

FIG. 5 shows the waveform of two signals which are to be transmitted in pulse position 1 and in pulse position 2, respectively. In the figure are shown the amplitude values which are sensed in the respective pulse positions, together with the other 22 pulse positions whose modulation is not shown. The amplitude values are to be expressed by means of pulse code modulated signals which according to the embodiment have 8 denominational positions and of these positions, 7 are used to express the amplitude value of the speech signals while the eighth is used for synchronizing and controlling purposes as will be explained more specifically herebelow.

FIG. 6 shows in an enlarged scale the pulse amplitude values indicated in FIG. 5, expressed in the form of pulse code modulated signals. In view of the fact that 7 pulses may be utilized, the amplitude values are reproduced with an accuracy of $1/127$. The translation of the pulse amplitude values into pulse code is carried out by means of analog-digital conversion in a manner known per se.

FIG. 7 shows two groups of subscribers A*l*–A*n* and B*l*–B*n* respectively. Each of the subscribers of the first group may be connected through its outgoing speech contact or individual contact UK to a common outgoing conductor or highway UFA and through its incoming speech contact IK to an incoming common highway IFA. In the same manner the subscribers of the first group may be connected to an incoming highway IFB and an outgoing highway UFB. The outgoing highway of each pair of highways is connectable through highway contacts FK*aa*, FK*bb* to the incoming highway of each other pair of highways and to its own incoming highway. In order to establish a connection with the main exchange there are furthermore provided highway contacts PK*au* and PK*bu* which connect the outgoing highways with an outgoing PCM-equipment and highway contacts PK*ai* and PK*bi* which connect the incoming highways with the incoming PCM-equipment. Closing of the individual contacts as well as the highway contacts is carried out by means of periodically repeated pulses in one of the pulse positions the number of which is 24 according to the embodiment. A selected contact will thus be closed every 125th $\mu$s. to allow during that pulse position a speech signal to be transmitted according to, for example, the "resonant transfer"-method (Swedish Patent 167,549). There will not be described in complete detail the principles of an electronic time division multiplex telephone system as these are known per se. However, only those details will be mentioned which are essential for the understanding of the principle of the invention. As it will be apparent from the description herebelow more than one PCM-equipment may be used between one and the same subexchange and the main exchange.

As has been mentioned previously, the eighth pulse of each pulse code modulated signal is utilized to transmit synchronizing signals and control signals. According to the embodiment this eighth pulse is used in three successive pulse groups to transfer synchronizing pulses while in each fourth pulse group or "frame" the eighth pulse of all 24 channels is utilized to transmit the control signals between the main exchange and the subexchange and vice versa (see Swedish patent application 4076/60). Accordingly, in each 0.5 millisecond, information consisting of 24 binary units may be transferred which is sufficient to transfer a considerable quantity of information. This quantity of information transferred every 0.5 millisecond is called a data channel but as it is apparent, it does not form a separate transmission path but is interwoven into the speech channels. Through this data channel which is set up in every fourth cycle, the main exchange will scan the subexchanges each of which has its individual number. The main exchange sends out these numbers in turn to all subexchanges, and only the subexchanges intended by the number will recognize it. If a condition change has occurred in the subexchange after the last scanning, for example there is a call from the subexchange, the subexchange when recognizing its own number sent from the main exchange, will send back a signal or stop order. Consequently, the main exchange interrupts the cyclic scanning or inquiry of the other subordinate exchanges and only deals with that subexchange from which the stop order has been obtained. Between the subexchange selected in this manner and the main exchange, signals will then be exchanged through the data connection. These signals have the purpose of indicating from the subexchange which extension has called, and from the main exchange signals are sent which are obtained as a consequence of the data processing of the information obtained from the subexchange and indicate for the subexchange which contacts are to be caused to work. It should be noticed that during this time the speech connection is continued through all the 24 channels and only the data channel, i.e., the eighth pulse of each fourth cycle, is used exclusively for the data processing between the main exchange and the selected subexchange. In order to enable the main exchange to localize a subscriber it is necessary to know, besides the number of the exchange obtained by the cyclic inquiry, also the number of the highway to which the subscriber is connected, and furthermore the number of the subscriber in the highway.

In order to elucidate the type of signalling which proceeds through the data channel, herebelow will be described, by way of example, the signalling when a subscriber carries out a call. It is assumed that the number of the subexchange is 24, the highway number is 01 and the extension number of the highway is 12. When the subscriber lifts his handset, there will arise a call condition in the subexchange 24. When the main exchange during the scanning sends out the code 24 as an inquiry, for example in binary form, the main exchange obtains a stop order as answer, for example the code 10. After this the subexchange sends the highway number 01 followed by the subscriber number 12 together with a code 01 which indicates that there is the question of a call. (If there should be a replacement of the handset, the code would be for example 05.) When the main exchange has received this information, it selects a connection path through which it is possible to get through to a register in a manner known per se and sends corresponding control signals to the subexchange so as to operate the contacts. The time division multiplex contacts which are necessary in the subexchange to set up the connection, will be operated during the pulse position selected by the main exchange.

If for example the main exchange has noticed that the pulse position 14 is free, the following signals will be sent from the main exchange to the subexchange:

02 cancels the call 01,
03 indicates that the following digit refers to a highway number,
01 highway number,
X3 indicates that the two following pairs of digits are: pulse position and instruction,
14 pulse position,
00 instruction (no instruction in the present case),
X4 indicates that the following two pairs of digits refer to subscriber number and instruction respectively,
12 subscriber number,
00 instruction (no instruction in the present case),
X5 indicates that the two following pairs of digits refer to the number of the PCM-link and to the instruction,
01 the number of the PCM-link,
06 instruction: record in the memory.

This last mentioned instruction refers to all preceding information and its meaning is that the individual contact number and the PCM-contact number are recorded in pulse position 14 of the contact memory for highway 01, after which the connection is obtained.

The process described hereabove contains no new principles but the novel idea is that the eighth pulse position of each fourth cycle is used in an otherwise conventional PCM-system so that no particular data transmission channel is needed. This data transmission channel is thus used for signal transmission each time the condition of a connection has to be changed and is for this reason common for the whole exchange and not only for a certain number of channels. It should be pointed out that due to the cyclic inquiry from the main exchange it is not necessary to connect physically the data senders and data receivers of the main exchange with each of the exchanges in turn but the subexchange and the main exchange are maintained connected with each other through the data transmission channel until the switching operation has been ended. Only that subexchange which has recognized its own number will be influenced by the signals received.

FIG. 8 shows a conventional PCM-system, in which the sender side is shown in the form of a block diagram. The highway contact PK*u* corresponds to one of the highway contacts PK*au* or PK*bu*, indicated in FIG. 7, by PF is indicated a pulse extender, by LF a logarithmic amplifier or compressor, by AD is indiciated an analog-digital converter and by KL is indicated a controlling clock device for the outgoing signals. In a conventional PCM-system a low pass filter as well as scanning contacts are necessary on the input as well as on the output side. As in this case we have already a time division multiplex system with amplitude modulated pulses, it will be possible to supply the amplitude modulated pulses directly to the pulse code sender part of the PCM-system. Thus the PCM-system does not need to have its own low-pass filters and channel contacts on the output side. On the other hand low pass filters and channel contacts are necessary on the input side of the subexchange.

Each sending part is controlled by a clock. In the whole system which consists of a main exchange and a number of subexchanges, one sole clock is provided, located in the main exchange. According to common practice the PCM-receivers are synchronized with the clock frequency of the PCM-senders, which is effected by means of the synchronizing pulses (the eighth pulse in each channel according to the example). On the receiving side consequently a clock frequency is found which is synchronous with the clock of the main exchange. By selecting the scanning frequency equal to the channel repetition frequency which according to the example is 8000 Hz., the channel repetition frequency can be directly used as a driving clock for the time division multiplex network of the subexchanges. Owing to the synchronizing, all PCM-terminals of the subexchange will run synchronously with the senders and consequently with the clock of the main exchange but the receivers will not be in phase because of the propagation time through the connection. In order to transmit the synchronizing pulses from the main exchange to a subexchange through a plurality of PCM-links one of the PCM-terminals connected to the subexchange is selected arbitrarily. When there is a fault in the arbitrarily selected link a switching will be carried out to another operating link. In this manner there may be obtained a local clock which in each subexchange can control the logic, the contact memory and all PCM-links outgoing from this subexchange. As mentioned this local clock is synchronous with the clock of the main exchange but is out of phase therewith by values varying in the different subexchanges and this phase shift will be increased still more when receiving the signals in the main exchange. All PCM-links originating from the same subexchange are thus in phase and in synchronism with each other and with the control means of the subexchange but not in a correct phase in relation to the clock of the main exchange.

FIG. 9 indicates diagrammatically that the phase shifts from the main exchange to the different subexchanges and in opposite direction, may be completely different in for example 3 parallel links.

FIG. 10 shows diagrammatically how the clock pulse in a subexchange is controlled by means of the synchronizing pulses arriving through an arbitrarily selected link. In the figure are shown two links which may be utilized alternatively for the transmission of synchronizing signals. As indicated symbolically these is provided a switching contact and a relay R which, as long as the signal connection exists through the selected link, maintains the switching contact in the position belonging to said link, but when the signal connection is interrupted for some reason, an automatic switching will be carried out to the other transmission link by releasing the relay. As it is easy to understand phase conformity will exist between the speech signals and the control signals only in that link, the synchronizing signal of which is used to produce the common clock pulse of the whole subexchange. Thus the problem consists in bringing also the speech signals of the other links into phase with the common clock pulse. If for example only one PCM-link should exist, this problem would not exist but the PAM-signal obtained from the PCM-terminal could quite simply be supplied directly to the time division multiplex exchange via a highway contact, for example contact P*ki* in FIG. 7 which is closed in step with the clock pulse corresponding to this link.

The difficulty which occurs when having several links may be overcome in a manner known per se wherein the PAM-signal obtained from each PCM-link is passed through channel contacts K*a*1–K*a*24 (see FIG. 11), each of which is controlled synchronously with its own link. The signals are then supplied through a high-pass filter F1–F24 belonging to the respective channel, so that the original voice frequency signal is reconstructed. These voice frequency signals are then passed from the ouput of each channel filter to all highways through the individual contacts KB1–KB24 of the last mentioned highways. These individual contacts are controlled by means of the contact memory synchronously with the common clock pulse selected for this subexchange. The denomination "individual contact" is activated so that the contacts KB1–KB24 are opened only in every 24th pulse position in the same manner as the individual contacts of the subscribers in comparison with the intermediate highway contacts, for example FK*aa*, FK*ab*, etc. in FIG. 7, which can be opened during each time pulse position.

The effect of the phase shift between the channels of the different links of the subexchange has thus been eliminated. By synchronizing each link by means of the synchronizing pulse belonging to the link, it is possible to identify in the links the channels 1–24 in a known manner. FIG. 11 shows in a corresponding manner as in FIG. 10 a subexchange with 2 PCM-terminals of which terminals the synchronizing pulse of one of the terminals is selected to determine the common clock frequency of the subexchange. The switching network is shown in a very simplified form, presupposing that the subexchange has only one highway and consequently there are no intermediate highway contacts. Of the individual contacts of the subscribers there are shown only two incoming contacts, IK1 and IK2, and two outgoing contacts UK1 and UK2. These contacts are controlled by the contact memory KM of the subexchange, which memory as mentioned above is controlled by the common clock pulse of the exchange. In this simplified arrangement the signal obtained through the channel 1 of link 1 on contact K*b*1 will be a pulse amplitude modulated signal in phase with the common clock pulse of the exchange as previously mentioned, and a subscriber, for example A*b*1, will be connected with said channel in that his individual contact and the contact P*ki*1 of the PCM-link are opened by the contact memory in pulse position 1. Analogous will be the conditions on the output side where the individual contact UK1 of the subscriber is opened by the contact memory in a determined pulse position, for example pulse position 2, and the signal is supplied through the highway contact P*ku*1 to the outgoing side of the link 1. As is apparent from the above, the pulse amplitude modulated signals from the outgoing individual contact of the subscriber may be directly used to be fed to the outgoing PCM-equipment without any change as also the highway contacts are controlled by the common clock pulse. The conditions are further elucidated by means of figures **12*a*–12*d*** where FIGS. 12*a* and 12*b* show the pulse positions of the link L1 and L2 respectively. As it appears there is a certain phase shift $\tau$ between the pulses arriving at the PCM-terminal in links L1 and L2 respectively. It is supposed that it is channel 1 of link 1 that carries a signal while the common clock signal of the whole subexchange is obtained from the link L2. Thus the signal which arrives through channel 1 in link 1 must be transformed into a signal which in phase coincides with the channel 1 of that link the synchronizing signal of which is valid for the subexchange. FIG. 12*c* shows the shape of the signal after having passed through the contact K*a*1 and the filter F1, and FIG. 12*d* shows the pulse amplitude modulated signals obtained through the contacts K*b*1 and which as it is apparent from the above, are in a correct phase with the pulse position 1, defined by the common clock pulse. Thus they may be treated by the switching network together with the signals of the other links.

Thus it is apparent that all contacts except those which follow immediately after the PCM-input terminal, are controlled by means of the contact memory and consequently run synchronously and in phase with the common clock pulse and the outgoing PCM-links which are controlled by this clock. The consequence of this will be that no channel filters or channel contacts will be required upon change from PAM to PCM. The only function which is to be carried out in the PCM-link is that the PAM-pulse obtained is coded and sent out. Thus each outgoing link requires only one contact which can work in 24 time pulse positions in comparison with the incoming PCM-link that requires one contact for each channel. In this manner a correlation has been obtained between the PCM-channels and the time positions in the switching network of the subexchange. All the time pulse positions and outgoing PCM-channels of the subexchange are thus in phase with each other and in synchronism with the clock pulse of the subexchange.

FIG. 13 shows diagrammatically two PCM-terminal equipments and the means cooperating with these in the main exchange. According to the embodiment the main exchange can cooperate with 32 links in all, and thus there are 32 units, each corresponding to those shown in FIG. 13. As has been mentioned in connection with the subexchange, there may be a phase shift between the different links, for example the link L1 may have a time delay $\tau_1$ and the link L2 a time delay $\tau_2$. As has been mentioned, it was necessary to use in the subexchange the synchronizing signal of one of the links to form a clock pulse common for the whole subexchange. Also in the main exchange there is provided a corresponding arrangement which allows that always only the synchronizing pulses of *one* of the channels are utilized when transmitting data signals, i.e., the eighth pulse of each fourth "frame." Should the link through which the transmission of data signals is carried out become faulty, a switching will be effected as indicated by means of a switching relay R. For the speech signals no synchronizing is required as the speech signals are stored according to the fundamental principle of the invention in a memory in the main exchange quite independently of their phase and they may be found there when sending out the signals as it will be explained in more detail herebelow. By SKA is indicated a shift register to which the seven binary code signals of the speech signal are supplied from the PCM-terminal. This shift register is emptied by means of the pulses of the link, for example pulse 8, and the signals are transferred to a buffer register SKB. Owing to the fact that the shift register SKA is emptied after the reception of each channel it is possible to feed into the shift register in turn information from all the 24 channels of a link. Thus the shift register will be set for each channel to a code corresponding to the original amplitude of the PCM-pulse. As the first seven bits are signal bits and the eighth is the synchronizing bit, this eighth bit will be utilized also to empty the shift register before receiving the subsequent channel 1 (time division multiplex position). This occurs in each link 24 times per "frame."

As there is a connection between each signal and the corresponding pulse position in the subexchange, each setting of the shift register corresponds to the amplitude of the signal in the corresponding channel and consequently to the corresponding pulse position in the subexchange. Thus the amplitude value is obtained in coded state in turn for all the 24 channels of a link in the shift register belonging to the link in the main exchange.

There is one shift register for each link. As the delay through the link from the subexchange to the terminal of the main exchange varies in each case as previously mentioned, also the setting of the shift registers will have different phase so that for example channel 1 of a certain link arrives at a moment that differs from the moment in which the channel 1 of another link arrives. This has been explained in connection with the subexchange with reference to FIGS. 12*a*–12*d*. The problem is to bring these signals which are in different phase but are synchronous, into such a relative sequence and into such a relation to the clock of the main exchange that it will be possible to find without difficulty which channel (time division multiplex position) arriving at the main exchange is associated with a channel outgoing from the main exchange, of an established connection.

As has been mentioned in the preamble this is effected according to the invention not as before by varying the delay of the links but by an operation whereby the signals arriving through each link are recognized by the control circuits of the intermediate exchange, stored and then sent out in a correct phase by means of a central clock device.

In FIG. 13 is shown an equipment for two incoming links L1 and L2, having an address memory AM and a switching memory KM of the magnetic core type belonging to each link. The pulse code modulated signals are supplied from the shift register SKA to the buffer register SKB by means of the eighth pulse of the channel. The buffer register is read by means of a pulse *t*1 coming from the central clock of the main exchange which clock generates all clock pulses necessary for the reading out and the recording in the different core memories. The relative time position of the pulses is shown in FIG. 14. The signal obtained when emptying the buffer register cannot be supplied to the switching memory KM belonging to the link before one more condition is filled, viz., that a further pulse *ts* is obtained from the clock. This is symbolized by means of the and-circuits 01–07, of which circuits only the first and the last are drawn. The purpose of this is to ensure that a reading out of the address memory has already been carried out when the signal consisting of 7 bits activates the respective seven cores of the switching memory. The address memory AM consists of 24 rows in correspondence to the number of channels in the link and of 2 x 5 columns so as to be able to register the link address as well as the channel address (32 links, 24 channels per link). The addresses are written into the address memory by means of the computer of the system as indicated by arrows DM. The memory is of the type described in Swedish patent application 12,307/60 in which rewriting is effected after each reading as long as the computer has not carried out any change. Reading of the information in the address memory is carried out by means of the reading pulse *t*1, reading being possible only in the row belong to the respective channel. The pulses obtained through the columns activate five flip-flops V1–V5 in the link address part as well as in the channel address part. The binary signals from the link address memory and from the channel address memory, obtained from the five flip-flop outputs are supplied to translators ORL and ORK respectively which in correspondence to the binary signal obtained supply current to 24 and 32 wires respectively, which form a matrix having 768 crossing points. Thus when a wire in each group becomes conducting, a current will pass through a diagonal conductor belonging to their crossing point which diagonal conductor also passes through the seven cores belonging to the respective crossing point. The result will be that the signal information belonging to a definite channel in a definite link is written into the matrix of the switching memory in the respective channel position of the square of that one of the 32 links (inclusively its own link if the computer has selected this link for setting up the connection) through which the signal information is to be transmitted. Each of the links (the number of which according to the embodiment is 32 and only two of which are shown in FIG. 13) has consequently 32 x 24 matrix squares for recording signal information in binary form. Obviously only 24 of the squares are used simultaneously in each matrix. The reading from these matrices will then be carried out upon sending of the signal. Hence, the effect of the different delays of the different links has been eliminated completely, due to the fact that the signal information has been stored in accordance with its destination address. This also allows that sending of the signal from the main exchange may occur through a channel different from the incoming channel whereby the risk of congestion is completely eliminated. No decoding and conversion of the signals into amplitude modulated signals will be necessary.

FIG. 14 shows the clock pulses generated by the cenral clock of the main exchanger. By *t*1 is indicated the reading pulse used for reading the cores of the address memory. Then follows the pulse *ts* the occurrence of which is a second condition that the and-circuits 01–07 permit the passage of the code signals from the buffer register to the switching memory. By *t*2 is designated the rewriting signal which, after each reading, rewrites the recorded information into the address memory as long as the record has not been erased by the computer. By *t*3 is indicated a O-setting signal which after each period sets all the bistable circuits to zero.

FIG. 15 shows how the reading out and the sending of the written signals is carried out. The core matrices of FIG. 15 correspond to those of FIG. 13 designated by KM and belonging to the link which has number 1 and to the link which has number 32. The wires indicated in FIG. 13 used for writing the information into the cores are not shown for the sake of clarity, only the wires used for the reading being shown. A shift register or channel counter KRB having 24 stages is stepped forward by means of the channel pulse *ts* coming from the central clock. The output signal from each stage of the channel counter is fed to an and-circuit A1–A24 the conductive condition of which also is dependent on the pulse *t*3 coming from the central clock. The output signal from, for example, the and-circuit A1 supplies current to a wire which extends through the cores belonging to the first channel (time pulse position) of all the 32 matrices which belong to the 32 incoming links and the position of which indicates the address link. As has been mentioned previously, each core matrix belonging to an incoming link has the words located in 32 columns, corresponding to the 32 address links and in 24 rows, corresponding to the 24 channels. From this follows that the wire supplied with current through the and-circuit A and extending through 32 x 32 groups of cores each of which consists of 7 cores, will find one written information at the most in each of the groups that correspond to the outgoing links, thus at the most in 32 groups of cores. This information will of course lie in that column of one of the 32 matrices which column corresponds to the address link. The row which is defined by A1 thus contains the coded information to be sent out in the first channel position in all 32 links. Through each of the word columns extend 7 reading wires through all 32 core matrices. When thus one of the 32 x 32 core groups which may contain information, is switched in consequence of the fact that the row wire is fed with current, a signal will be obtained on the 7 wires belonging to the address link. The signal is fed to a buffer register SKC and from there the signal elements are fed in parallel to a shift register SKD from which they are fed in series to the PCM-equipment by means of the synchronizing signal of the central clock. This shift register is necessary because the reading of the signals from the core memory is effected too slowly compared with the rhythm of the PCM-pulses. When the channel counter KRB is stepped forward to stage 2, a signal will be obtained on the output of the and-circuit A2 whereby the second wire is supplied with current and consequently those of the 32 x 32 core groups (maximally 32) will be remagnetized which contain an information word. The buffer register SKC corresponding to the respective address links obtain a sequence of 24 signals which are supplied to the pulse code modulation equipment once per time pulse position in the respective link. This continues until all time pulse positions have been scanned, after which the scanning will be repeated. The sender of control data is connected with the PCM-equipment in all 32 links. The sender of control data uses the eighth pulse position as control channel in the same way as mentioned previously.

I claim:

1. In a telecommunication system transmitting pulse code modulated time division multiplex signals, an intermediate exchange connected to subexchanges through connecting links and connecting arbitrary incoming pulse time position channels in outgoing links, said intermediate exchange comprising, for each incoming link, separate means for receiving in series pulse code modulated signals and assembling said signals in parallel so as to obtain a binary word, a plurality of memory means, each of said memory means being associated with a different one of said incoming links and having a plurality of groups of binary elements for storing said binary words received by the associated incoming link, each channel in each of the outgoing links being associated with a different group of binary elements in each of said memory means, addressing means for selecting a required group of binary elements, and central controlling including means for controlling said addressing means so as to record the received binary word in a group of binary elements corresponding to a required channel in a required outgoing link, means for reading out said stored binary words, and means for transmitting the read out binary words serially through the respective outgoing link, said central controlling means including a clock means for controlling the transmitting of all the recorded binary words in the order defined by their channel designation simultaneously in all the outgoing links whereby the original time positions of the signals to be sent out are maintained notwithstanding a possible phase shift of the signals in the incoming links.

2. The system according to claim 1 wherein said intermediate exchange further includes an intermediate memory for each incoming link for storing the incoming signals in a phase independent of said clock means and controlled by said clock means so as to be emptied in a phase determined by said central clock device.

3. The system according to claim 1, in which said intermediate exchange further comprises a computer for controlling subexchanges and each of the pulse code modulated time division multiplex signals having at least one pulse position for transmitting alternatingly a synchronizing pulse for driving all pulses in the system synchronously and a control pulse for the control of the function of the system, while the other pulses of the time division multiplex position are used to transmit speech information, and after a number of time division multiplex cycles which comprise synchronizing pulses there follows a time division multiplex cycle which comprises a control pulse, the control pulse of all the time pulse positions together forming a transmission channel for control information in which channel the binary information number corresponds to the number of time division multiplex positions in the system.

4. The system according to claim 3 including more than one pulse transmission link between the main exchange and a subexchange, all pulse transmission links transmitting the same control information by means of the pulse used alternatively as a synchronizing signal and a control signal, and a switch arranged to supply said pulse from only one transmission link for synchronizing respectively said control means in the main exchange and for performing a switching to another link as soon as a fault arises in the selected link.

References Cited

UNITED STATES PATENTS

| | | |
|---|---|---|
| 3,274,339 | 9/1966 | Herry. |
| 3,281,536 | 10/1966 | Dupieux. |
| 3,221,102 | 11/1965 | Merz. |
| 3,280,265 | 10/1966 | Von Sanden et al. |
| 3,227,811 | 1/1966 | Hart et al. |
| 3,227,810 | 1/1966 | Hart. |

RALPH D. BLAKESLEE, Primary Examiner